United States Patent [19]

Hirokawa

[11] Patent Number: 5,936,746
[45] Date of Patent: *Aug. 10, 1999

[54] FACSIMILE APPARATUS

[75] Inventor: Masashi Hirokawa, Atsugi, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/623,219

[22] Filed: Mar. 28, 1996

[30] Foreign Application Priority Data

Mar. 31, 1995 [JP] Japan .................................. 7-074919

[51] Int. Cl.$^6$ ........................................ H04N 1/32
[52] U.S. Cl. .................... 358/468; 358/404; 358/434; 379/102.01
[58] Field of Search .................... 358/468, 404, 358/405, 406, 434, 435, 436, 442, 444; 371/32, 35, 37.3, 37.7, 40.2; 379/93.32, 93.18, 93.25, 93.31, 100.01, 100.06, 102.01

[56] References Cited

U.S. PATENT DOCUMENTS

| | | |
|---|---|---|
| Re. 34,842 | 1/1995 | Eiji et al. .................................. 358/404 |
| 4,887,162 | 12/1989 | Arai .......................................... 358/400 |
| 5,031,179 | 7/1991 | Yoshida et al. ............................. 371/32 |
| 5,048,078 | 9/1991 | Satomi et al. ...................... 379/100.01 |
| 5,077,742 | 12/1991 | Tsumura et al. ........................... 371/32 |
| 5,105,423 | 4/1992 | Tanaka et al. ........................... 358/439 |
| 5,172,246 | 12/1992 | Yoshida .................................... 358/406 |
| 5,428,458 | 6/1995 | Aiba et al. ............................... 358/405 |
| 5,565,999 | 10/1996 | Takahashi ................................ 358/404 |
| 5,617,220 | 4/1997 | Ueno ....................................... 358/434 |

*Primary Examiner*—Edward L. Coles
*Assistant Examiner*—Madeleine AV Nguyen
*Attorney, Agent, or Firm*—Oblon, Spivak, McClelland, Maier & Neustadt, P.C.

[57] ABSTRACT

A facsimile apparatus for transferring data which is not facsimile image data, for example error data, filing information data, or ROM data. A memory memorizes the data, a read/write controller controls reading/writing the data in the memory, and a communication controller controls starting communication with another facsimile apparatus or a maintenance service center using by a protocol of NSS or NSF. Further, an ECM buffer memorizes the data for re-transferring the data by using ECM communication, and a modem transfers the data in the ECM buffer with a same speed rate as a speed rate of transferring the facsimile image data.

18 Claims, 6 Drawing Sheets

```
[BACKGROUND ART]
         A.  READ REQUEST
                    START ADDRESS, END ADDRESS
         B.  READ DATA
                    START DATA,.........,END DATA
         C.  WRITE REQUEST
                    WRITE ADDRESS, DATA1,DATA2,.......,DATAN
[PRESENT INVENTION]
         A.  READ: IN CASE OF READING IN ADDRESS 1-N
                    START ADDRESS1, END ADDRESS1, START ADDRESS2, END ADDRESS2,...,
                    START ADDRESSN, END ADDRESSN

B.  READ DATA
                    START DATA1,.........,END DATA1
                    START DATA2,.........,END DATA2
                         |         |        |
                         |         |        |
                    START DATAN,.........,END DATAN
         C.  WRITE REQUEST
                    WRITE ADDRESS1, DATA1,  DATA2,......,DATAN
                    WRITE ADDRESS2, DATA1', DATA2',......,DATAN'
                    WRITE ADDRESS3, DATA1", DATA2",......,DATAN"
```

*FIG. 2*

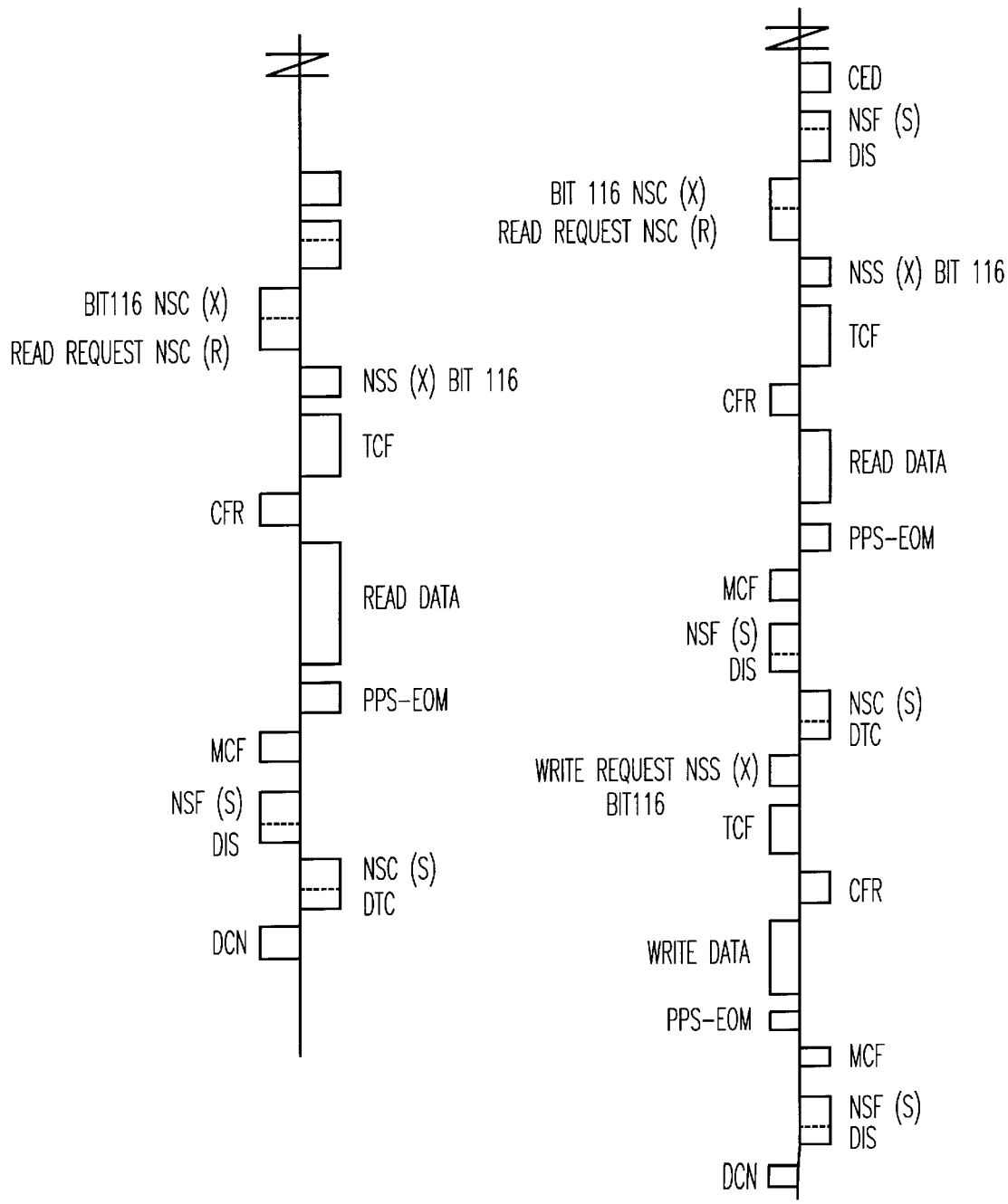
*FIG. 4*   *FIG. 5*

FACSIMILE APPARATUS

BACKGROUND OF THE INVENTION

1. Field of the Invention

This invention generally relates to a facsimile apparatus. The invention is more particularly related to a facsimile apparatus for connecting to another facsimile apparatus or a host computer in a maintenance service center, and for changing or reading/writing data in a parameter memory and/or a flash ROM of the facsimile apparatus.

2. Discussion of the Background

Generally, facsimile apparatuses which are operated by programs memorized in a ROM (Read Only Memory) read documents and print received image data. The facsimile apparatuses communicate with other facsimile apparatuses or a maintenance service center using by users' information, for example a phone or number which are memorized as filing information data in parameter memories. The facsimile apparatuses also have ECM (Error Correction mode) buffers for a function of ECM re-transferring data.

The facsimile apparatuses are able to be controlled by the maintenance service center or the other facsimile apparatuses to rewrite their ROM data or their parameter memories. In case of errors or troubles in the facsimile apparatuses, the facsimile apparatuses send error or trouble messages to the maintenance service center as facsimile image data. This type of facsimile apparatus is disclosed in Japanese Laid-Open Patent Publication No. 44674/1989.

Another type of facsimile apparatus which is disclosed in Japanese Laid-Open Patent Publication No. 245664/1989 loads necessary blocks of data from the host computer for its own memory jointly.

However, such facsimile apparatuses transfer data with a slow speed rate of 300 bps, while transferring facsimile image data with a high speed rate of over 2400 bps.

The facsimile apparatuses also do not use ECM (Error Correction Mode) for transferring data to read/write data to the internal memory.

Moreover, it takes a long time to transfer data with the maintenance service center or the other facsimile apparatuses, and thus the facsimile apparatuses are not efficient.

SUMMARY OF THE INVENTION

It is therefore an object of the present invention to provide a novel information processing apparatus with an operation panel in which the above-mentioned disadvantages are eliminated.

According to one aspect on the invention, a facsimile apparatus for transferring data which is not facsimile image data has a memory memorizing the data, a read/write controller reading and/or writing the data in the memory, a communication controller starting communication with another facsimile apparatus or a maintenance service center by using a protocol of NSF, an ECM buffer memorizing the data for re-transferring the data by using ECM communication, and a modem transferring the data in the ECM buffer at a same speed rate as a speed rate of transferring the facsimile image data.

As a further aspect of the invention, a facsimile apparatus using NSS instead of the NSF can be utilized.

As further aspects of the invention, a facsimile apparatus can transfer error or trouble data in case of an unrecoverable error or trouble occurring, and also filing information data and rewritable ROM (Read Only Memory) data used for operating the facsimile apparatus can be transferred.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates a transferring format;

FIG. 4 illustrates a sequence chart of a transferring protocol of reading data in the present invention;

FIG. 5 illustrates a sequence chart of a transferring protocol of writing data in the present invention;

DESCRIPTION OF THE PREFERRED EMBODIMENT

An embodiment of the invention will now be described in detail with reference to the drawings.

Figure 1:
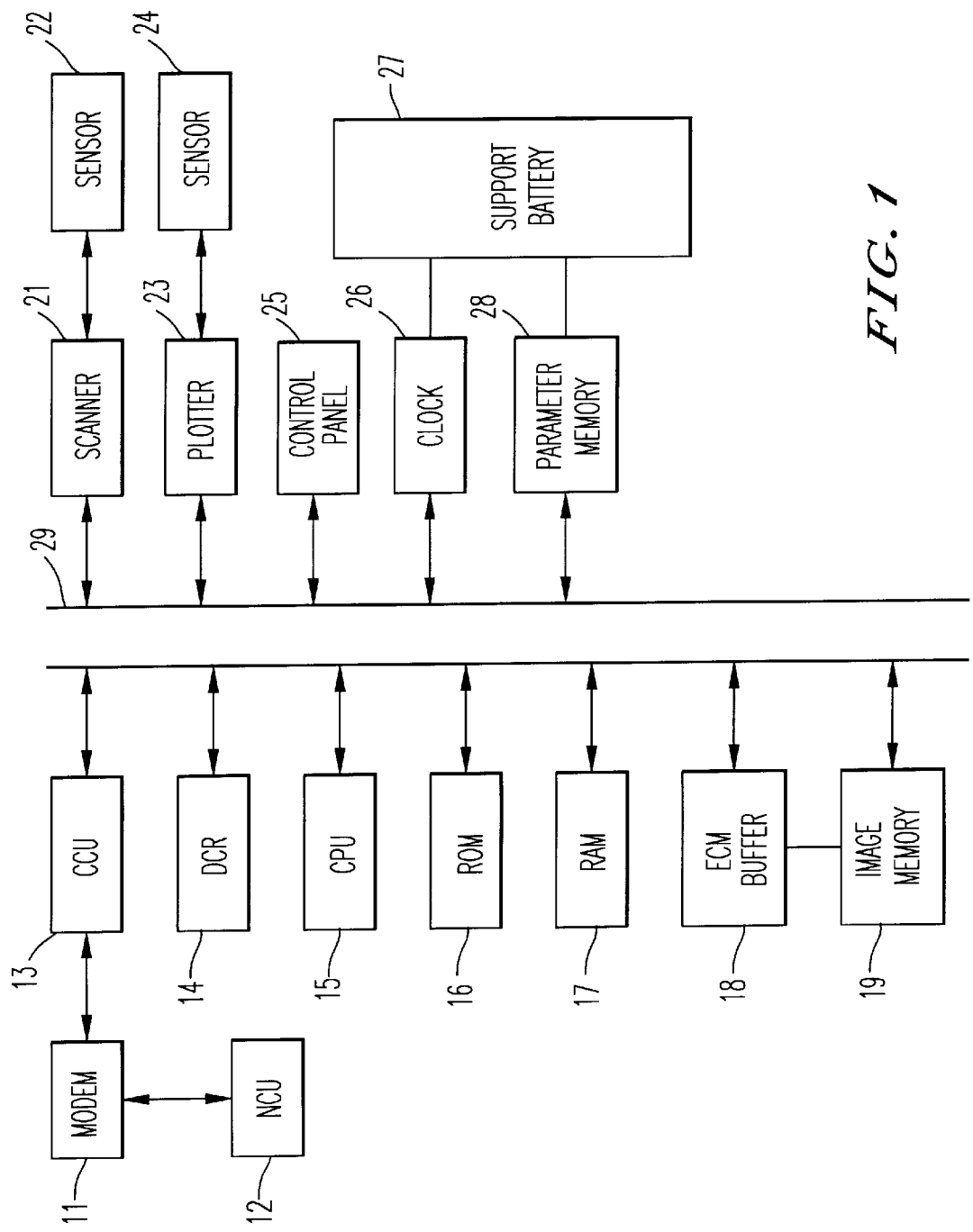
FIG. 1 is a block diagram of a facsimile apparatus of an embodiment of the present invention.

FIG. 1 is a block diagram of a facsimile apparatus of an embodiment of the present invention. In FIG. 1, the facsimile apparatus includes a modem 11, a NCU (Network Control Unit) 12, a CCU (Communication Control Unit) 13, a data compression and reconstruction unit 14, a CPU (Central Processing Unit) 15, a flash ROM (Read Only Memory) 16, a RAM (Random Access memory) 17, an ECM (Error Correction Mode) buffer 18, an image memory 19 for receiving and sending image data, a scanner 21 for scanning documents, a first sensor 22 for sensing characters in documents, a plotter 23 for plotting characters, a second sensor 24 for sensing a character for printing, a control panel 25 which has a switch, keys, and a display, a clock 26, a support battery 27, a parameter memory 28 for registering user's data, and a bus 29.

The facsimile apparatus has functions to communicate with another facsimile apparatus or a host computer in a maintenance service center, and changing or reading/writing data in the parameter memory 28 and flash ROM 16.

FIG. 2 illustrates a transferring format. In a background art, facsimile apparatuses have a reading/writing memory with a rate of 300 bps and the facsimile apparatuses can set one start/end address, so that a send speed is slow and is not efficient. In other words, in FIG. 2, the facsimile apparatuses in the background art requests to set a "START ADDRESS" and an "END ADDRESS" once in a data block for a read request from the service center.

The facsimile apparatuses in the background art can only set one start address in data writing, and thus such facsimile apparatuses are not efficient to write data. In other words, the facsimile apparatuses in the background art send "START WRITE ADDRESS", "DATA 1", "DATA 2", "DATA N" for the writing request from the service center. A length of this sending data block is decided for one frame (size of the one frame is set up).

The present invention, in FIG. 2, can set a large number of address in ECM mode by using the ECM buffer. In other words, the facsimile apparatus in the present invention can set an address in all of blocks in one operation as "START ADDRESS 1", "END ADDRESS 1", "START ADDRESS 2", "END ADDRESS 2" . . . "START ADDRESS N", "END ADDRESS N". Next, the facsimile apparatus in the present invention sends data between the start addresses and the end addresses in every block. In other words, the facsimile apparatus in the present invention sends "START DATA 1", "END DATA 1", "START DATA 2", "END DATA 2", "START DATA N", "END DATA N" in one operation.

In a case of the service center's requesting to write to the facsimile apparatus, the facsimile apparatus in the present invention sends an address of a frame firstly, and after that the facsimile apparatus sends "WRITE ADDRESS 1", "DATA 1", "DATA 2", "DATA N" in a first frame, "WRITE ADDRESS 2", "DATA 1", "DATA 2", "DATA N" in a second frame, "WRITE ADDRESS 3", "DATA 1", "DATA 2", "DATA N" in a last frame. The sent frames being only three in this example.

Figures 3A, 3B:
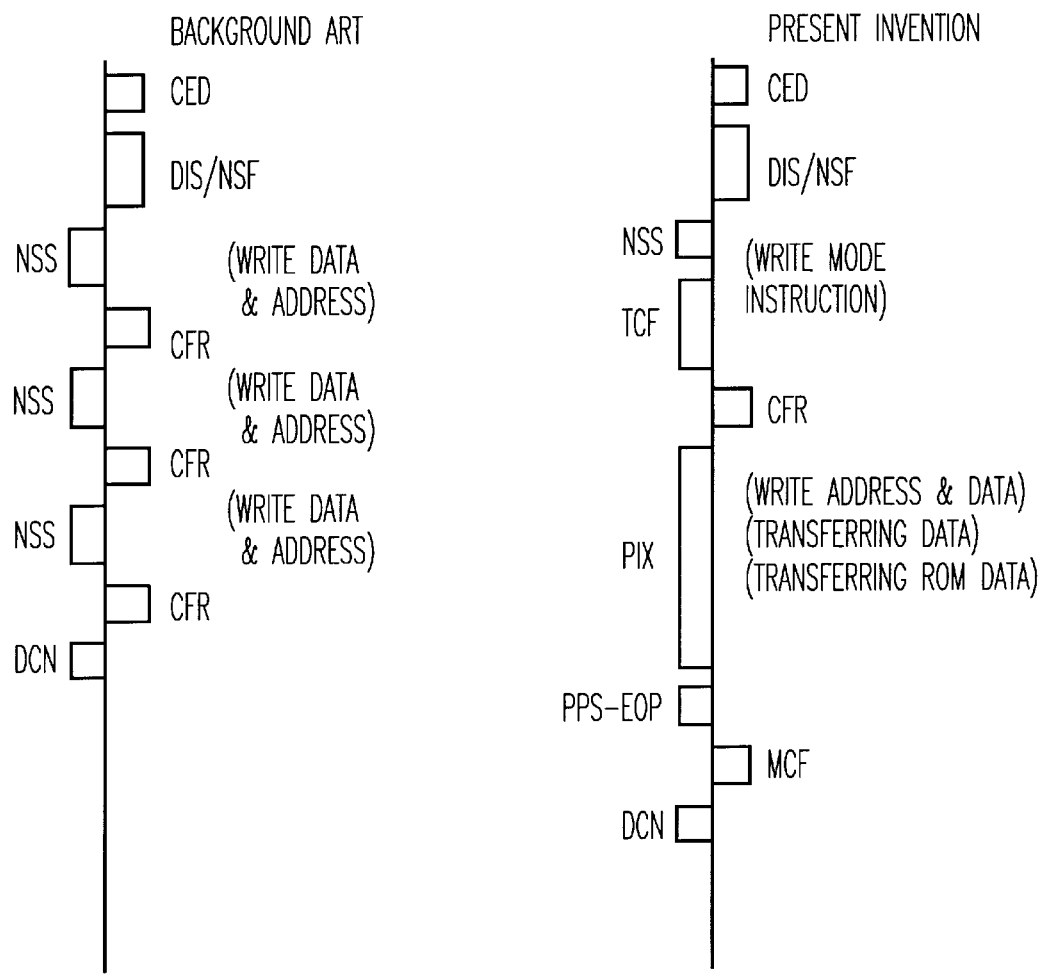
FIG. 3 illustrates sequence charts of the present invention and the background art.

FIG. 3 illustrates sequence charts of the present invention and the background art.

In the background art, a receiver, with a speed rate of 300 bps, sends CED (Call Station Identification) and DIS (Digital Identification Signal) /NSF (Non Standards Facilities). After sending NSS (Non Standard Facilities Set Up) to the receiver, the sender sends a first write data and address. After receiving CFR (Confirmation To Receive) from the receiver, the sender send a second write data and address. The sender repeats the above operation. After finishing all sending of all of the write data and addresses, the sender sends DCN (Disconnect) and logs off the line. A speed rate of communication in the background art is 300 bps.

In the present invention, with a speed rate of over 2400 bps, a receiver sends CED and DIS/NSF. After sending NSS to the receiver, the sender sends TCF (Training Check). After receiving CFR from the receiver, the sender sends PIX which includes a write address and data, transferring data, or transferring ROM data. Next the sender sends PPS-EOP (Partial Page Signal End Of Message) to the receiver, and after receiving MCF (Message Confirmation) from the receiver, the sender sends DCN and logs off the line.

FIG. 4 illustrates a sequence chart of a transferring protocol of the reading data in the present invention, and FIG. 5 illustrates a sequence chart of a transferring protocol of the writing data in the present invention.

In FIG. 4, the facsimile apparatus sends a CED and NSF(S)/DIS to the service center. The service center sends NSC (Non Standard Facilities Command) (X) of bit 116 and NSC (R) of bit 116 to the facsimile apparatus.

Responding to the NSC (X) and NSC (R), the facsimile apparatus sends NSS (X) of bit 116 and after sending the NSS (X) of bit 116, the facsimile apparatus sends TCF (Training Check). Responding to then receiving CFR from the service center, the facsimile apparatus sends a read data and after sending the read data, the facsimile apparatus sends PPS-EOM (Partial Page Signal End Of Message) to the service center. The service center sends MCF, and after sending MCF, the service center sends NSF(S) and DIS to the facsimile apparatus. The facsimile apparatus sends NSC (S) and DTC (Digital Transmit Command) to the service center. The service center then sends DCN and logs off the line.

In FIG. 5, the facsimile apparatus sends a CED and NSF(S)/DIS to the service center. The service center then sends NSC(X) of bit 116 and NSC(R) of bit 116 to the facsimile apparatus. Responding to the NSC(X) and NSC (R), the facsimile apparatus sends NSS(X) of bit 116, and after sending the NSS(X) of bit 116, the facsimile apparatus sends TCF. Responding to then receiving CFR from the service center, the facsimile apparatus sends a read data, and after sending the read data, the facsimile apparatus sends PPS-EOM to the service center. The service center then sends MCF, after sending MCF, the service center sends NSF(S) and DIS to the facsimile apparatus. The facsimile apparatus then sends NSC(S) and DTC to the service center. The service center then sends a NSS(X) as a write request of bit 116 and TCF to the facsimile apparatus. After receiving CFR from the facsimile apparatus, the service center sends a write data, and after sending write data, the service center then sends PPS-EOM to the facsimile apparatus. The facsimile apparatus then sends MCF, and after sending MCF, the facsimile apparatus sends NSF(S) and DIS to the service center. The service center then sends DCN and logs off the line.

Figures 6, 7:
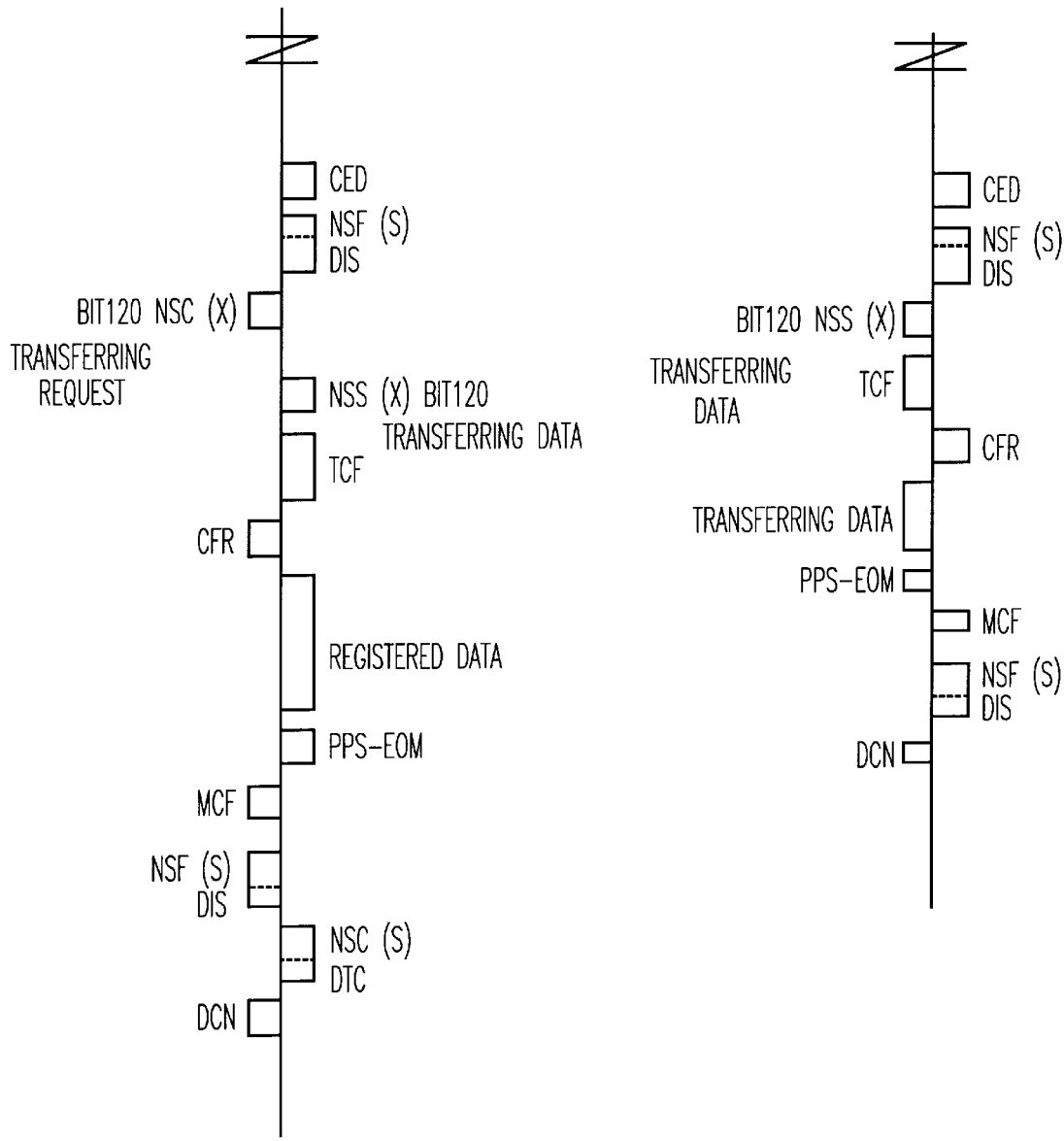
FIG. 6 illustrates a sequence chart of a transferring protocol of reading registered data in the present invention.
FIG. 7 illustrates a sequence chart of a transferring protocol of writing data in the present invention.

FIG. 6 illustrates a sequence chart of a transferring protocol of reading registered data in the present invention, and FIG. 7 illustrates a sequence chart of a transferring protocol of the writing data in the present invention. In this embodiment, data of telephone numbers are explained, but instead of the telephone numbers, data of error messages or data in the ROM may be used in the same protocol, as other examples.

In FIG. 6, reading data of the telephone numbers, the facsimile apparatus sends a CED and NSF(S)/DIS to the service center. The service center then sends NSC(X) of bit 116 and NSC(R) of bit 116 to the facsimile apparatus. Responding to the NSC(X) and NSC(R), the facsimile apparatus sends NSS(X) of bit 116. After sending the NSS(X) of bit 116, the facsimile apparatus sends TCF. Responding to then receiving CFR from the service center, the facsimile apparatus sends a read data, and after sending the read data, the facsimile apparatus sends PPS-EOM to the service center. The service center then sends MCF. After sending MCF, the service center sends NSF(S) and DIS to the facsimile apparatus. The facsimile apparatus then sends NSC(S) and DTC to the service center. The service center then sends DCN and logs off the line.

In FIG. 7, writing data of the telephone numbers as registering data, the facsimile apparatus sends CED and NSF(S)/DIS to the service center. The service center then sends NSS(X) of bit 120 and TCF to the facsimile apparatus. After receiving CFR from the facsimile apparatus, the service center sends a transferring data, and after sending the transferring data, the service center sends PPS-ECM to the facsimile apparatus. The facsimile apparatus then sends MCF. After sending MCF, the facsimile apparatus sends NSF(S) and DIS to the service center. The service center then sends DCN and logs off the line.

In a case of writing data in the ROM in the facsimile apparatus from the service center, the facsimile apparatus sends a CED and NSF(S)/DIS to the service center. The service center then sends NSS(X) of bit 116 and TCF to the facsimile apparatus. After receiving CFR from the facsimile apparatus, the service center sends a ROM data, and after sending the ROM data, the service center sends PPS-NULL to the facsimile apparatus. The facsimile apparatus then sends MCF. After receiving the MCF, the service center sends the ROM data again and sends PPS-ROM. The facsimile apparatus then sends MOF, NSF(S), and DIS to the service center. The service center then sends DCN and logs off the line.

In a case of the facsimile apparatus receiving an automatic service call from the service center, the facsimile apparatus sends a CED and NSF(S)/DIS to the service center. The service center then sends NSS(X) of bit 116 and TCF to the facsimile apparatus. After receiving CFR from the facsimile apparatus, the service center sends a service call data, and after sending the service call data, the service center sends PPS-EOM to the facsimile apparatus. After receiving MCF, NSF(S), and DIS from the facsimile, the service center sends NSF(S) and DTC back to the facsimile. The facsimile then sends DCN and logs off the line.

Next, a format of error transferring is explained. In a case of an error or trouble occurring in a facsimile apparatus in a background art, the facsimile apparatus converts an error information of the error or trouble to an image data, and sends the image data as facsimile image data to a service center.

A facsimile apparatus of the present invention sends code data that are pre-decided on each error, without converting error information to an image data, to a service center automatically in a high speed protocol. The service center receives the code data automatically. The facsimile apparatus also calls to the service center automatically, and sends error data to the service center.

A basic transferring format that is sent by the facsimile apparatus is as follows:

[MAIN IDENTIFIER], [SUB IDENTIFIER], [Ll], [DATA OF FIRST ERROR MESSAGE], [DATA OF FIRST ERROR MESSAGE], [STOP CODE] [DATA OF SECOND ERROR MESSAGE], [DATA OF SECOND ERROR MESSAGE], [END CODE].

For example, the [MAIN IDENTIFIER] is xx, and the [SUB IDENTIFIER] is yy, and the xx and yy are 1 byte code data.

The [Ll] means a length of data that is a fixed length of, e.g., 2 bytes (in a case of using ASCII code, the length of data is 4 bytes). The [STOP CODE] is 0xff (256 bits) which means end the error data of the first trouble. The [END CODE] is 0xff, 0xff that means end all the error data.

In case of three errors or troubles, [FIRST ERROR DATA], [STOP CODE], [SECOND ERROR DATA], [STOP DATA], [THIRD ERROR DATA], [END CODE] are sent. A sample of error transferring is shown as follows:

xx, yy, Ll, error-sub code, 0xff, 0xff (1)

xx: main identifier
yy: sub identifier
Ll: length of data error-sub code: hardware error code
0xff, 0xff: end code Next, a file transferring format is explained. The file transferring format is as follows:

[MAIN IDENTIFIER], [SUB IDENTIFIER], [Ll], [TRANSFERRING DATA], [END CODE].

For example, in case of sending 2 portions of the file data, 2 transferring data using stop code.

In a case of yy=01, file information (file length, file name, file type) is sent first. While, in a case of yy=02, file data (binary data) is sent. So a file name or a file type is sent firstly, stop code is sent next, and sent file data and end code are sent. A sample of file transferring is shown as follows;

xx, yy, Ll, transfer data, 0xff, 0xff (2)

xx: main identifier
yy: sub identifier
Ll: length of data
0xff, 0xff: end code

Next, a ROM data transferring format is explained.

(a) ROM transfer information

Next, a ROM transferring information is explained.
The ROM transferring format is as follows:

[MAIN IDENTIFIER], [SUB IDENTIFIER] [Ll], [ROM TRANSFERRING DATA], [TRANSFERRING MODE: (all data or part data)], [DATA MODE (:compression or not)], [TOTAL BLOCK NO.], [BLOCK NO.], [LENGTH OF DATA], [CHECK SUM], [END CODE].

In a case that the [TRANSFERRING MODE] is 00, all of the data are transferred, and in a case that the [TRANSFERRING MODE] is not 00, part of the data are transferred (01 means first block of data, 02 means second block of data, 03 means third block of data . . . ).

The [DATA MODE]=00 is not compressed, and the [DATA MODE]=01 is compressed.

The [TOTAL BLOCK NO.] is a total number (2 bytes) of all transferring blocks, and the [BLOCK NO.] is a number (2 bytes) of transferring blocks. In a case that all data are transferred, the [BLOCK NO.] is not necessary ([BLOCK NO.]=0000).

The [LENGTH OF DATA] is a length of transferring data (4 bytes), [CHECK SUM] is a check sum (number of word data) for the blocks. Samples of the ROM transferring are shown as follows:

xx,yy,Ll,00,01,0016,0000,00100000,xxxx,0xff (3)

xx: main identifier
yy: sub identifier
Ll: length of data
00: means all data
01: compress
0016: total block number
0000: block number
00100000: length of data (1 byte)
xxxx: check sum
0xff: stop code The above (3) means that all data (16 blocks) are compressed (1M bytes) and transferred.

xx,yy,Ll,01,00,0002,0001,00020000,xxxx,0003,00020000, yyyy, 0xff (4)

xx: main identifier
yy: sub identifier
Ll: length of data
01: means part data
00: not compress
0002: total block number
0001: block number
00020000: length of data
xxxx: check sum
0003: block number
00020000: length of data
yyyy: check sum
0xff: stop code (4) means that 2 block data (first and third blocks) are not compressed and transferred.

(b) transferring all ROM data

Next, a ROM transferring information is explained. (b) is sent after sending (a).

The ROM transferring format is as follows:

[MAIN IDENTIFIER], [SUB IDENTIFIER], [Ll], [END OR NOT END MODE], [DATA], [END CODE].

The [END OR NOT END MODE]=00 means not an end and the [END OR NOT END MODE]=01 means an end. The stop code separates each block, and after a last block, the end code is sent. A sample of all the ROM transferring is shown as follows:

xx,yy,Ll,00,data,data, . . . Oxff xx,yy,Ll,00,data,data, . . . , Oxff xx,yy,Ll,01,data . . . Oxff,Oxff (c) transferring designated block of the ROM data The designated block of the ROM data transferring format is as follows:

[MAIN IDENTIFIER], [SUB IDENTIFIER], [Ll], [END OR NOT END MODE], [BLOCK NO.], [DATA], [END CODE].

The [END OR NOT END MODE]=00 means not an end and the [END OR NOT END MODE]=01 means an end.

xx,yy,L1,00,0002,data . . . Oxff xx,yy,L1,00,0002,data . . . Oxff xx,yy,L1,01,0002 . . . Oxff,Oxff xx: main identifier yy: sub identifier which means a designated block data Ll: length of data 00: means not end mode 0002: means the second block of 128 bytes data.

Oxff: stop code

01: means end mode

Oxff,Oxff: end code

Figure 8:
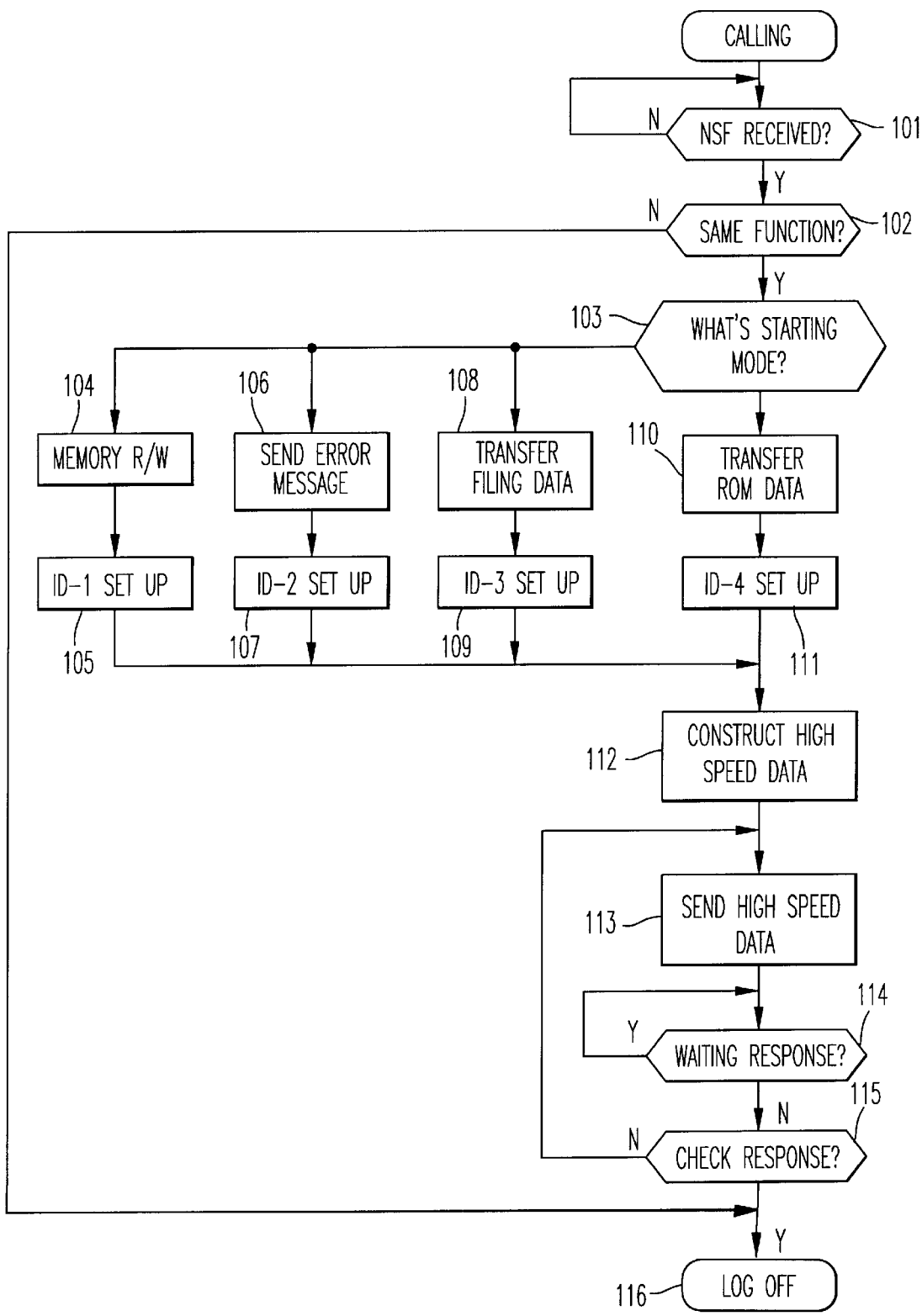
FIG. 8 illustrates a flow chart showing a facsimile apparatus' operation.

FIG. 8 illustrates a flow chart showing the facsimile apparatus' operation.

The service center first receives NSF (step 101), and then the facsimile apparatus checks whether the service center has a same function as the facsimile apparatus has or not (step 102). In the step 102, if the service center has the same function, i.e., YES in step 102, the facsimile apparatus changes a starting mode (step 103).

In the step 103, in a case of a memory read/write (step 104), ID-1 is set up (step 105), in a case of sending an error message (step 106), ID-2 is set up (step 107), in a case of transferring file data (step 108), ID-3 is set up (step 109), and in a case of transferring ROM data (step 110), ID-4 is set up (step 111).

After setting up ID-1, ID-2, ID-3, or ID-4, high speed data which are corresponded to the ID are constructed (step 112), and the high speed data are transmitted (step 113). A response is then waited for (step 114), and after the response is received, the system proceeds to step 115 where the response is checked (step 115), and in a case that the response is OK, the line is logged off (step 116).

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A facsimile apparatus for transmitting transmission data and receiving reception data which is not facsimile image data, comprising:

a reprogrammable memory;

a communication controller for controlling starting communication with another facsimile apparatus or a maintenance service center to transmit said transmission data and to receive said reception data by using a protocol of NSS (Non Standard Facilities Set Up) and to change contents stored in said reprogrammable memory based on said received reception data; and an ECM (Error Correction Mode) buffer for memorizing said reception data for re-transferring said data by using ECM communication; and a modem for transmitting said transmission data and receiving said reception data with a same speed rate as a speed rate of transmitting and receiving facsimile image data.

2. The facsimile apparatus according to claim 1, wherein said communication controller automatically calls said maintenance service center in a case of an error occurring.

3. The facsimile apparatus according to claim 2, wherein said communication controller starts communication with said another facsimile apparatus or said maintenance service center by using said protocol of said NSS after automatically calling said maintenance service center in a case of the error occurring to transfer said data of said error by said modem.

4. The facsimile apparatus according to claim 3, wherein said error data is memorized in said ECM buffer and said modem transfers the error data which is memorized in said ECM buffer with a same speed rate as a speed rate of transferring facsimile image data.

5. The facsimile apparatus according to claim 1, wherein said communication controller starts communication with said another facsimile apparatus or said maintenance service center by using said protocol of said NSS in a case of transferring filing information data which are memorized in said programmable memory as text data to transfer said filing information data by said modem.

6. The facsimile apparatus according to claim 5, wherein said modem transfers said filing information data without changing to facsimile data, with a same speed rate as a speed rate of transferring facsimile image data.

7. A facsimile apparatus for transmitting transmission data and receiving reception data which is not facsimile image data, comprising:

a reprogrammable memory;

a communication controller controlling starting communication with another facsimile apparatus or a maintenance service center to transmit said transmission data and to receive said reception data by using a protocol of NSF (Non Standard Facilities) and to change contents stored in said reprogrammable memory based on said received reception data; and an ECM (Error Correction Mode) buffer for memorizing said reception data for re-transferring said data by using ECM communication; and a modem for transmitting said transmission data and receiving said reception data with a same speed rate as a speed rate of transmitting and receiving facsimile image data.

8. The facsimile apparatus according to claim 7, wherein said communication controller starts communication with said another facsimile-apparatus or said maintenance service center by using protocol of said NSF in a case of receiving ROM (Read only Memory) data as text data to receive said ROM data by said modem.

9. The facsimile apparatus according to claim 8, wherein said modem receives said ROM data with a same speed rate as a speed rate of transferring facsimile image data.

10. A facsimile apparatus for transmitting transmission data and receiving reception data which is not facsimile image data, comprising:

a reprogrammable memory means;

a communication control means for controlling starting communication with another facsimile apparatus or a maintenance service center to transmit said transmission data and to receive said reception data by using a protocol of NSS (Non Standard Facilities Set Up) and to change contents stored in said reprogrammable memory based on said received reception data; and an ECM (Error Correction Mode) buffer means for memorizing said reception data for re-transferring said first-data by using ECM communication; and a transmission/reception means for transmitting said transmission data and receiving said reception data with a same speed rate as a speed rate of transmitting and receiving facsimile image data.

11. The facsimile apparatus according to claim 10, wherein said communication control means automatically calls said maintenance service center in a case of an error occurring.

12. The facsimile apparatus according to claim 11, wherein said communication control means starts communication with said another facsimile apparatus or said maintenance service center by using said protocol of said NSS after automatically calling said maintenance service center in a case of the error occurring to transfer said data of said error by said transmission/reception means.

13. The facsimile apparatus according to claim 12, wherein said error data is memorized in an ECM buffer and said transmission/reception means transfers the error data which is memorized in said ECM buffer means with a same speed rate as a speed rate of transferring facsimile image data.

14. The facsimile apparatus according to claim 10, wherein said communication control means starts communication with said another facsimile apparatus or said maintenance service center by using said protocol of said NSS in a case of transferring filing information data which are memorized in said reprogrammable memory means as text data to transfer said filing information data by said transmission means.

15. The facsimile apparatus according to claim 14, wherein said transmission/reception means transfers said filing information data without changing to facsimile data, with a same speed rate as a speed rate of transferring facsimile image data.

16. A facsimile apparatus for transmitting transmission data and receiving reception data which is not facsimile image data, comprising:

a reprogrammable memory means;

a communication control means for controlling starting communication with another facsimile apparatus or a maintenance service center to transmit said transmission data and to receive said reception data by using a protocol of NSF (Non Standard Facilities) and to change contents stored in the reprogrammable memory means based on said received reception data; and an ECM (Error Correction Mode) buffer means for memorizing said reception data for re-transferring said data by using ECM communication; and a transmission/reception means for transmitting said transmission data and receiving said reception data with a same speed rate as a speed rate of and receiving facsimile image data.

17. The facsimile apparatus according to claim 16, wherein said communication control means starts communication with said another facsimile apparatus or said maintenance service center by using said protocol of said NSF in a case of receiving ROM (Read Only Memory) data as text data to receive said ROM data by said transmission/reception means.

18. The facsimile apparatus according to claim 17, wherein said transmission/reception means receives said ROM data with a same speed rate as a speed rate of receiving facsimile image data.

* * * * *